United States Patent
Lizarraga Galarza

(10) Patent No.: US 10,689,295 B2
(45) Date of Patent: Jun. 23, 2020

(54) CEMENTS AND CEMENT MIXTURES WITH HIGH MECHANICAL PERFORMANCE AT SHORT AGES

(71) Applicant: CEMENT INTERNATIONAL TECHNOLOGIES, S.L., Madrid (ES)

(72) Inventor: Serafin Lizarraga Galarza, Madrid (ES)

(*) Notice: Subject to any disclaimer, the term of this patent is extended or adjusted under 35 U.S.C. 154(b) by 44 days.

(21) Appl. No.: 16/094,393

(22) PCT Filed: Apr. 19, 2016

(86) PCT No.: PCT/ES2016/070274
§ 371 (c)(1),
(2) Date: Oct. 17, 2018

(87) PCT Pub. No.: WO2017/182678
PCT Pub. Date: Oct. 26, 2017

(65) Prior Publication Data
US 2019/0039954 A1    Feb. 7, 2019

(51) Int. Cl.
C04B 28/04 (2006.01)
C04B 7/52 (2006.01)
C04B 7/02 (2006.01)
C04B 40/00 (2006.01)
C04B 103/32 (2006.01)

(52) U.S. Cl.
CPC ............... *C04B 28/04* (2013.01); *C04B 7/02* (2013.01); *C04B 7/527* (2013.01); *C04B 40/0032* (2013.01); *C04B 40/0042* (2013.01); *C04B 2103/32* (2013.01)

(58) Field of Classification Search
CPC ........... C04B 7/02; C04B 7/527; C04B 28/04; C04B 40/0032; C04B 40/0042; C04B 2103/32
See application file for complete search history.

(56) References Cited

U.S. PATENT DOCUMENTS 4,012,264 A    3/1977  Murray et al.
2012/0012034 A1    1/2012  Guynn et al.

FOREIGN PATENT DOCUMENTS

WO    2014/175295 A1    10/2014

OTHER PUBLICATIONS

International Search Report for PCT/ES2016/070274, dated Jul. 14, 2016.

*Primary Examiner* — Anthony J Green
(74) *Attorney, Agent, or Firm* — Daniel R. Evans; Merchant & Gould P.C.

(57) ABSTRACT

Portland cements of type and category CEM I 52.5 R are governed by standard UNE-EN 197-1. These cements additionally have a granulometric distribution with a Blaine fineness greater than 6500 cm2/g, a tricalcium silicate content, C3S, greater than 55% by weight and a tricalcium aluminate content, C3A, greater than 4% and less than 25% by weight and with a sum of both greater than 75%. These cements have a strength according to UNE 196-1 at 1 day greater than 40 MPa and at 28 days greater than 65 MPa. Mixtures of these cements with a common cement are governed by standard UNE-EN 197-1. These mixtures present high mechanical performance at short ages. A procedure obtains these mixtures and their use in the manufacture of cement derivatives, such as concretes, mortars and slurries.

19 Claims, 2 Drawing Sheets

CEMENTS AND CEMENT MIXTURES WITH HIGH MECHANICAL PERFORMANCE AT SHORT AGES

This application is a National Stage Application of PCT/ES2016/070274, filed Apr. 19, 2016, which application is incorporated herein by reference. To the extent appropriate, a claim of priority is made to the above-disclosed application.

FIELD OF INVENTION

The present invention refers to cements and cement mixtures that present high mechanical performance at short ages, the procedure for obtaining said mixture, and its use in concretes, mortars, slurries and other cement-derived products.

BACKGROUND OF THE INVENTION

In the manufacture of concrete and other cement derivatives, there are various techniques for developing high initial strength when the aim is to achieve rapid stripping or to put works into service quickly.

One of the most common techniques for achieving these high initial strengths involves using a high dosage of cement in the concrete. In this respect, it should be borne in mind that the maximum content of cement in concrete is limited to approximately 400 kg/m$^3$, in order to reduce the negative effects of hydraulic and thermal shrinkage. There is also an upper limit for the values of some concrete components, such as, for example, alkalis and tricalcium aluminate (C3A) which come mainly from cement in order to avoid possible pathologies in concrete such as the alkali-arid reaction (alkali silica reaction ASR) and that of secondary ettringite (delayed ettringite formation DFR). This implies that the use of high quantities of cement leads to high quantities of these components, which can also compromise the durability of the concrete. In addition, this technique involves a high cost and from the environmental point of view it is not highly recommended due to the high emission of $CO_2$, and the large amount of raw materials and energy that are needed.

Another one of the most widely-used techniques for achieving high strength at short ages involves the thermal treatment of concrete. In Calleja, J. "Heat treatments with concrete", *Construction reports* Vol. 120, 193, 1967, the thermal treatment of concrete is described using various techniques, such as the preheating of materials, immersion in hot water, steam curing and electrical heating. In spite of being a very effective system, it requires significant investments, with high costs due to energy sources such as electricity or steam. In addition it is a system that, for the above reasons, only applies to fixed installations, mainly prefabrication, which account for a very low percentage of cement derivatives.

Another known way of accelerating the performance of cement derivatives is the use of "accelerating" chemical additives such as calcium chloride or calcium formate, among others. The document "Effect of calcium formate as an accelerator on the physicochemical and mechanical properties of pozzolanic cement pastes", *Cement and Concrete Research* June 2004; 34(6), 1051-1056 describes how adding calcium formate to cement shortens the initial time and increases the compressive strength and combined water content.

The main function of these additives is to promote hardening, although they can also accelerate setting. This means that both the setting time and hardening time have to be controlled, which is extremely complicated in practice, mainly due to the large influence of small variations in temperature and product composition. In practice, these accelerators have been discarded mainly in practice because of the problems of workability and durability.

Other additives that can be added to concrete to increase its compressive strength include plasticisers and superplasticisers. This strength is inversely proportional to the amount of water added. Therefore, in order to produce more resistant concretes, the amount of water is considerably reduced, which results in mixtures that are difficult to handle, and it is necessary to add plasticising and superplasticising additives. It is a technology used and is very effective, especially for achieving high final strengths (28 days), but has very important limits to short ages, especially when they are less than 24 hours.

The use of so-called "special cements" has also been described in order to achieve high compressive strengths over short periods. These cements are cements that, in addition to complying with the physical, mechanical and chemical specifications established by the UNE-EN 197-1: 2000 standard with respect to common cements, have more demanding requirements with respect to certain characteristics of the same, such as, for example, one-day strength, granulometry and high fineness. Thus, for example, in document ES2438621 B2, a cement with high mechanical performance at short ages is described. Its composition includes C3A in a proportion of 0 to 3%, and C3S in an amount greater than 80%, which is a sulforesistant cement.

Although the use of these special cements constitutes a very interesting alternative for obtaining cement derivatives with high strength in short times, the cost associated with it is very high and, as we will see later, a waste of its properties in most cases.

It would therefore be desirable to find an alternative that overcomes the shortcomings indicated above. In other words, it would be desirable to find an alternative to existing cement derivatives, such as concretes, mortars and slurries, among others, that would allow the development of high compressive strengths at times of less than 24 hours, while being economical environmentally viable and technically acceptable due to the state of the art in the technology of cement derivatives and their Regulations.

SUMMARY OF THE INVENTION

The problem to be solved in the present invention is, therefore, to provide an alternative to the existing cement derivatives, that allows high compressive strengths to be developed in times inferior to 24 hours, and that at the same time is economic and environmentally viable.

The solution is based on the fact that inventors have discovered that this is possible by using a mixture of two cements. More specifically, they have discovered that when a common cement is mixed according to the UNE-EN 197-1 standard with a cement that, in addition to complying with the aforementioned standard, has more demanding requirements, such as high one-day strengths, mixtures are obtained whose behaviour strongly depends on the quantity of said cement in the mixture, as will be explained in detail in the detailed description of the invention.

With regard to this cement, which in addition to complying with the UNE-EN 197-1 standard has more demanding requirements, such as high one-day strengths, the first aspect of the invention is aimed at an E cement, which is a Portland Cement of type and category CEM I 52.5 R according to the UNE-EN 197-1 standard and which also has a granulometric distribution with a Blaine fineness greater than 6500 cm2/g, a tricalcium silicate content, C3S, greater than 55% by weight and a tricalcium aluminate content, C3A, greater than 4% and less than 25% by weight and with a sum of both greater than 75% with a strength according to UNE 196-1 at 1 day greater than 40 MPa and at 28 days greater than 65 MPa, determined using 225±1 g of water and the amount of superplasticiser required to achieve a mortar consistency of 200±5 mm in accordance with EN 1015-3.

In a second aspect, the invention is aimed at a mixture of cements comprising a C cement, which is a common cement according to standard UNE-EN 197-1, with an E cement as defined above, where the proportion of E cement in the total mixture is in the range of 0.5% to 50%.

From these mixtures, cement derivatives can be obtained that present high compressive strengths in times of less than 24 hours.

Therefore, a third aspect of the invention is aimed at a procedure for obtaining cement derivatives from cement mixtures, which have compressive strengths in the range of 1 MPa to 100 MPa at times less than 24 h, including the following stages:

a) preparing a plurality of cement mixtures C and E, varying the percentages of E cement from 0.5% to 50% in relation to the total mixture;
b) determining the compressive strength of each of the mixtures obtained in step a), $Ri_{mix}$, and the compressive strength of C cement, Ric at different ages ranging from 0 to 28 days;
(c) obtaining the contribution to the compressive strength of the mixtures, CRi, per kg of C cement and E cement for each age and for each mixture, using the formulae:

$$CRi \text{ per kg } C \text{ cement} = Ri_C/m_{totalcementC}$$

$$CRi \text{ per kg } E \text{ cement} = (Ri_{mix} - (Ri_C * m_C/m_{total}))/m_E$$

where $m_{total}$ is the sum of the cement mass C, $m_C$, and the cement mass E, $m_E$.
d) obtaining the percentage of contribution to the compressive strength of E cement with respect to that of C cement for each age and for each mixture; given by:

(CRi per kg E cement/CRi per kg C cement)×100 e) repeating steps a) to d) using different cements E and C and different total cement masses, thus obtaining a set of results depending on the cements used, the age of the mixtures and the percentage of each of the cements in the mixture;
f) depending on the desired compressive strength at different ages and the required technical and economic requirements, using the set of results from step e), determining the mixtures that satisfy those requirements.

In a preferred embodiment, the mixtures prepared in step a) are subjected to heat treatment and/or chemical accelerants are added.

In a fourth aspect, the invention is directed to the use of the mixtures previously mentioned for the manufacture of concretes, mortars and slurries.

DETAILED DESCRIPTION OF THE INVENTION

Figure 1A:
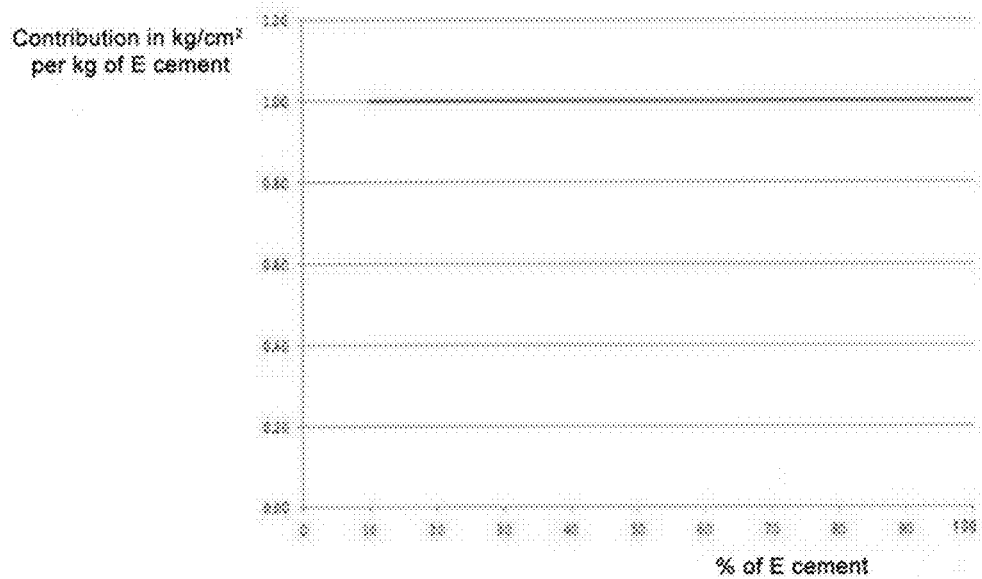
FIG. 1a)—FIG. 1a) is a reference graph that represents the expected contribution of E cement per kg to the compressive strength in a cement mix.

As previously indicated in the first aspect, the invention is aimed at a cement that is a Portland Cement of type and category CEM I 52.5 R according to standard UNE-EN 197-1 and which also has more demanding requirements in terms of chemical composition, strength to one-day compression and to high granulometries and finenesses.

The chemical composition of the clinker of this E cement with regard to its components C3S (tricalcium silicate) and C3A (tricalcium aluminate), which provide high initial compressive strengths, is such that the content of C3S is greater than 55% by weight and the content of C3A is greater than 4% and less than 25% by weight, provided that the sum of both is greater than 75%.

Preferably the C3S content is in the range of 55% to 75% by weight and the C3A content is in the range of 10% to 25% by weight; more preferably the C3S content is in the range of 75% to 90% by weight and the C3A content is in the range of 10% to 25% by weight. Even more preferably, the C3S content is in the range of 65% to 75% by weight and the C3A content is in the range of 4 to 10% by weight. And even more preferably, the C3S content is greater than 75% by weight and the C3A content is in the range of 4 to 10% by weight.

Table 1 shows the physical properties of an E cement object of this invention. Specifically, it shows the physical properties of a cement whose clinker composition is as follows:
C3S—82% by weight
C3A—9% by weight
C2S (dicalcium silicate)—0
C4AF (Tetracalcium aluminate ferrite)—5% by weight

TABLE 1

Physical behaviour of an E cement object of the invention whose content in C3S is 82% by weight and its content in C3A is 9% by weight, determined by current EN Standards.

| Consistency of shaking to mortar (%) | 57.0 |
| Mixing water (%) | 37.1 |
| Setting principle (min) | 80 |
| Setting finish (min) | 105 |
| Le Chatelier Expansion (m.m) | C-0.0 |

The components of the cement of the invention were subjected to a milling process to study their granulometry, which must be as high as possible because the finer the cement, the higher its speed of hydration and the development of performance.

Table 2 shows the particle size distribution of a cement according to the present invention, the chemical composition of which is as follows:
C3S—82% by weight
C3A—9% by weight
C2S (dicalcium silicate)—0
C4AF (Tetracalcium aluminate ferrite)—5% by weight
This table shows the granulometries for three different grades of grinding, called TP-24, TP-12 and TP-6, which refer, respectively, to those in which 95% of the particles are smaller than 24, 12 and 6 microns.

TABLE 2

Granulometric analysis of a cement object of the invention whose content in C3S is 82% by weight and its content in C3A is 9% by weight.

| Pass (%) | TP-24 | TP-12 | TP-6 |
|---|---|---|---|
| 0.20 micron sieve | 2.27 | 5.53 | 13.12 |
| 0.30 micron sieve | 3.46 | 9.86 | 22.67 |
| 0.40 micron sieve | 4.74 | 12.44 | 28.34 |
| 0.50 micron sieve | 6.06 | 13.47 | 30.64 |
| 0.60 micron sieve | 7.14 | 14.04 | 31.88 |
| 0.70 micron sieve | 7.95 | 14.51 | 32.83 |
| 0.80 micron sieve | 8.55 | 15.04 | 33.85 |
| 0.90 micron sieve | 9.08 | 15.62 | 34.91 |
| 1.00 micron sieve | 9.62 | 16.24 | 36.02 |
| 1.10 micron sieve | 10.21 | 16.89 | 37.17 |
| 1.20 micron sieve | 10.84 | 17.61 | 38.40 |
| 1.30 micron sieve | 11.51 | 18.38 | 39.72 |
| 1.40 micron sieve | 12.20 | 19.23 | 41.14 |
| 1.60 micron sieve | 13.65 | 21.15 | 44.30 |
| 1.80 micron sieve | 15.14 | 23.34 | 47.77 |
| 2.00 micron sieve | 16.65 | 25.72 | 51.37 |
| 2.20 micron sieve | 18.16 | 28.25 | 55.05 |
| 2.40 micron sieve | 19.65 | 30.88 | 58.66 |
| 2.60 micron sieve | 21.11 | 33.56 | 62.13 |
| 3.00 micron sieve | 23.96 | 38.98 | 68.50 |
| 3.20 micron sieve | 25.34 | 41.67 | 71.33 |
| 3.60 micron sieve | 28.06 | 46.91 | 76.35 |
| 4.00 micron sieve | 30.73 | 51.88 | 80.58 |
| 4.30 micron sieve | 32.74 | 55.39 | 83.28 |
| 4.60 micron sieve | 34.73 | 58.71 | 85.63 |
| 5.00 micron sieve | 37.38 | 62.84 | 88.29 |
| 5.60 micron sieve | 41.31 | 68.43 | 91.45 |
| 6.00 micron sieve | 43.90 | 71.78 | 93.11 |
| 6.50 micron sieve | 47.10 | 75.61 | 94.80 |
| 7.00 micron sieve | 50.22 | 79.01 | 96.14 |
| 8.00 micron sieve | 56.22 | 84.66 | 98.01 |
| 9.00 micron sieve | 61.80 | 88.93 | 99.09 |
| 10.00 micron sieve | 66.90 | 92.19 | 99.66 |
| 11.00 micron sieve | 71.48 | 94.69 | 99.91 |
| 12.00 micron sieve | 75.57 | 96.55 | 100.00 |
| 13.00 micron sieve | 79.20 | 97.87 | 100.00 |
| 14.00 micron sieve | 82.39 | 98.78 | 100.00 |
| 15.00 micron sieve | 85.15 | 99.37 | 100.00 |
| 17.00 micron sieve | 89.56 | 99.90 | 100.00 |
| 20.00 micron sieve | 94.11 | 100.00 | 100.00 |
| 22.00 micron sieve | 96.15 | 100.00 | 100.00 |
| 25.00 micron sieve | 98.11 | 100.00 | 100.00 |
| 28.00 micron sieve | 99.19 | 100.00 | 100.00 |
| 32.00 micron sieve | 99.82 | 100.00 | 100.00 |
| 36.00 micron sieve | 100.00 | 100.00 | 100.00 |
| 40.00 micron sieve | 100.00 | 100.00 | 100.00 |
| 45.00 micron sieve | 100.00 | 100.00 | 100.00 |
| 50.00 micron sieve | 100.00 | 100.00 | 100.00 |
| Diameter at 50% (microns) | 6.96 | 3.84 | 1.92 |

The Blaines of these three cements are 8240 cm$^2$/g in the case of the cement called TP-24, 11300 cm$^2$/g in the case of the cement called TP-12, and 17400 cm$^2$/g.

With regard to the compression strength, developed by the previous E cement with Blaine 8240 cm$^2$/g, object of the present invention, the strengths to compression were obtained from a concrete whose composition is given by:

TABLE 3

Composition of a concrete manufactured with an E cement whose C3S content is 82% by weight and its C3A content is 9% by weight, determined according to current EN Standards.

| Cement (content of C3S: 82%, C3A content: 9%) | 390 kg/m$^3$ |
|---|---|
| Limestone gravel 6-14 | 800 kg/m$^3$ |
| Limestone sand 0-6 | 635 kg/m$^3$ |
| Limestone sand 0-2 | 450 kg/m$^3$ |

TABLE 3-continued

Composition of a concrete manufactured with an E cement whose C3S content is 82% by weight and its C3A content is 9% by weight, determined according to current EN Standards.

| Additive Sika Viscocrete 20 | 2.0 kg/m$^3$ |
|---|---|
| w/c (water/cement) | 0.380 |
| Flow extension (diameter in mm) | 700 |
| Density | 2463 kg/m$^3$ |
| Concrete temperature | 20.5° C. |

The compressive strengths measured at different ages are presented in Table 4 in accordance with the current regulations in cylindrical test tubes of 15 cm in diameter and 30 cm in height.

TABLE 4

Compression strengths developed by a concrete obtained from an E cement object of the invention whose content in C3S is 82% and content in C3A is 9%, determined according to current EN Standards.

| Time | Compressive strength in (MPa) |
|---|---|
| 6 hours | 15.2 |
| 8 hours | 47.6 |
| 10 hours | 62.6 |
| 12 hours | 71 |
| 15 hours | 72.4 |
| 20 hours | 76.2 |
| 1 day | 78.8 |
| 2 days | 84.4 |
| 3 days | 85 |
| 7 days | 88.7 |
| 28 days | 96.1 |

In a second aspect, the invention refers to a mixture of cements comprising a common cement according to standard UNE-EN 197-1, hereinafter referred to as C cement, with the E cement described above. The proportion of E cement in the total mixture is in the range of 0.5% to 50% by weight, preferably in the range of 0.5 to 30% by weight.

The present inventors have discovered that, contrary to what might be thought, the contribution to the compressive strength in kg/cm$^2$ of a cement mixture such as that indicated above per kg of E cement does not follow a linear relationship with the percentage of E cement added, but that this contribution decreases as the percentage of E cement in the mixture increases in the range from 0 to 50%. FIG. 1a) shows the expected variation in the contribution to the compressive strength of the mixture and FIG. 1b) shows the experimental variation observed by the present inventors.

In addition, inventors have found that this special behaviour of E cements, i.e., superior performance in mixtures with small percentages, as shown in FIGS. 1a) and 1b), is produced from a certain fineness as described in the following example in which an E cement is mixed: C3S—82%, C3A—8%, C2S—0%, C4AF—4%, in mixtures with a common CEM 142.5 R cement with different percentages obtaining the following results at an age of 12 hours.

TABLE 5

Compressive strength (MPa) of various mixtures of C (CEM I 42.5 N) and E cement depending on the percentage of E cement in the mixture, starting from E cements with different finenesses

| Blaine | % of E cement | | | |
|---|---|---|---|---|
| (cm$^2$/g) | 10 | 20 | 50 | 100 |
| 11200 | 3.2 | 2.4 | 2 | 1.6 |
| 8430 | 2.49 | 1.89 | 1.43 | 1.32 |
| 6470 | 1.65 | 1.65 | 1.45 | 1.28 |

Figure 2:
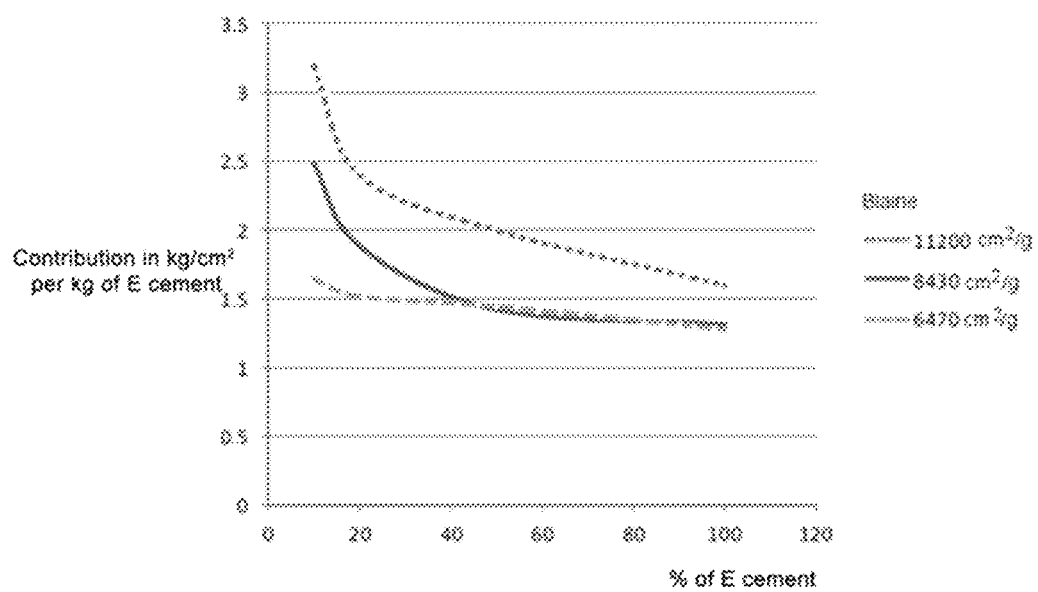
FIG. 2—Contribution of E cement per kg, to the compression strength in mixtures of a common CEM cement I 42.5 R with an E cement of composition C3S—82%, C3A—8%, C2S—0%, C4AF—4% at an age of 12 hours at different Blaines.

FIG. 2 shows the data obtained. This figure shows that Blaines less than 6500 cm$^2$/g performance is relatively low, and that it is similar for both low percentages and high percentages. They are cements that, when used in high percentages and even at 100%, have practically no loss of performance, per kg of E cement, as occurs with Blaines over 6500 approximately.

In order to determine a higher level, if any, than the described behaviour of E Cement in mixtures in small percentages, the previous cement was ground up to blaines of 24500 cm$^2$/g. It was not possible to reach higher finenesses with the available technologies and the basis of this invention was proved: that the finer the E cement, the greater the yield in the mixtures at lower percentages, due to the high number of very fine and reactive particles due to their composition, and that exceeding a certain quantity does not work individually, losing yield.

As an example, to see the benefits of the mixture defined above, let's consider a concrete formed by:
a) 350 kg/m$^3$ of common C cement, which is a common cement CEM I 42.5 N whose strength at 12 hours is 100 kg/cm$^2$. Therefore, it can be considered that the contribution to the strength at 12 hours per kg of common C cement will be 100/350=0.28.
b) 350 kg/m$^3$ of E cement according to the invention that it is a 52.5 R cement whose content in C3S is 82% and content in C3A is 8%, whose strength at 12 hours is 370 kg/cm$^2$. Therefore, it can be considered that the contribution to the strength at 12 hours per kg of special cement will be 370/350=1.06.

If the aim is to obtain a concrete whose compression strength at 12 hours is 150 kg/cm$^2$, until now the way to achieve these properties implied either increasing the dosage of common C cement, which, for the reasons previously commented on in the background section, is not advisable, or E cement can be used directly, which is a waste of resources, since such E cement develops compressive strengths considerably higher than desired in the example shown and involves a very high cost.

The present inventors have discovered that the desired strength can be developed with a mixture of both cements, using a low percentage of E cement, overcoming, therefore, the disadvantages implied by the overdosing of common C cement or the use of E cement. That is to say, they solve the problem in a more efficient way.

If it were considered that the contribution to the compressive strength of each of the cements varies linearly, based on the example given above, one would expect that a mixture containing 90% C cement and 10% E cement would develop a compressive strength given by the sum of the contributions of C cement and E cement, in such a way that the compressive strength at 12 hours of that mixture would be:

$$(350\times0.9\times0.28)+(350\times0.1\times1.06)=125 \text{ kg/cm}^2$$

If the mixture were such that it contained 80% C cement and 20% E cement, the expected theoretical strength would be:

$$(350\times0.8\times0.28)+(350\times0.2\times1.06)=152 \text{ kg/cm}^2$$

Therefore, making a cement mixture such as the one indicated in a proportion of 80% of C cement and 20% of E cement would obtain the desired strength of 150 kg/cm$^2$, with the consequent saving of common C cement that would have been necessary if the dosage had to be increased, and of E cement if it had to be used independently.

As mentioned above, this would be expected if the contribution to the compressive strength of E cement varied linearly. However, the researchers have discovered that this contribution is not linear, but follows the variation shown in FIG. 1b), which leads to savings in the consumption of E cement even greater than expected if there were a linear relationship, with the significant economic, environmental and industrial improvements that this entails. Table 6 shows the results obtained.

TABLE 6

Expected and experimental theoretical compressive strengths of two cement mixtures according to the invention

| | | |
|---|---|---|
| % of C cement | 90 | 80 |
| % of E cement | 10 | 20 |
| Expected theoretical compressive strength (kg/cm$^2$) | 125 | 152 |
| Experimental theoretical compressive strength (kg/cm$^2$) | 172 | 197 |

As this cement mixing technology is not included in the current Concrete Regulations, in order to evaluate the quality of the cement obtained as a mixture in accordance with this patent, the weighted average of the components of the cements and those of their mineralogical compositions of their clinkers will be calculated.

Thus, the mineralogical composition of the cement clinker resulting from the mixture will be given by the weighted average of its contents in common C cement and in E cement, and in the same way in the cement derivative obtained. As an example, the content of C3S in the mixture is given by:

% of C3S in the mixture=$(m_C \times\% $ C3S in $C$ cement+ $m_E \times\%$ C3S in $E$ cement$)/m_{total}$ where $m_{total}=m_C+m_E$, where $m_C$ is the $C$ cement mass and $m_E$ is the $E$ cement mass.

The content of the remaining clinker components is calculated in the same way.

In addition to the above advantages, it should be noted that the cement mixtures described above allow for the control of variables that are required in a cement derivative such as:

1) Workability Time

As has been commented in the section on the background of the invention, the workability time is enormously inconvenient in some of the techniques of acceleration, and for this reason it constitutes an important variable to control in the mixtures previously described.

The workability of cement derivatives is very sensitive to C3A content and temperature, while it is not very sensitive to C3S content.

Table 7 presents the dosage tests for the manufacture of a concrete with the E cement described in the present invention, with the amount of C3A and C3S present in said cement varying.

In view of these results, it can be seen how an increase in C3A at the expense of C3S allows considerable increases in initial compressive strength, but the final strength is worse, and the workability time decreases considerably as indicated above.

This behaviour of E cement is reproduced in the cement mixtures described in this invention, as shown in Tables 8 and 9, which present the results of equivalent studies for mixtures of C cement (CEM I 42.5 R) with E cement, with E cement proportions of 10% (Table 8) and 20% (Table 9).

TABLE 7

Dosage tests for the manufacture of a concrete obtained from E cement only with the concentrations of C3S and C3A indicated.

| Cement E | % C3S | % C3A | W/C | Aggregate dosage (kg/m3) ||| Superplast. Glenium T | Delvocrete E Stabiliser | % Accelerator (aluminate) |
|---|---|---|---|---|---|---|---|---|---|
| | | | | Arid 4-12 | Sand 0-6 | Silicea L70/80 | | | |
| 400 | 81 | 9 | 0.35 | 650 | 770 | 450 | 1.40% | 0.35% | 2.50% |
| 400 | 75 | 17 | 0.35 | 650 | 770 | 450 | 1.40% | 0.35% | 2.50% |

| Cement E | Cone cm | Density test tubes (kg/m³) | Working time before adding the accelerant minutes | Mechanical strength (Mpa) |||||| 
|---|---|---|---|---|---|---|---|---|---|
| | | | | 7 hours | 8 hours | 1 day | 2 days | 7 days | 28 days |
| 400 | 26 | 2372 | 103 | 10.3 | 24.1 | 56.7 | 63.4 | 77.2 | 89.7 |
| 400 | 26 | 2365 | 57 | 12.8 | 16.8 | 47.9 | 56.3 | 69.9 | 79.9 |

TABLE 8

Dosage tests for the manufacture of a concrete obtained from a mixture of C cement (CEM I 42.5 R) with E cement, where the percentage of E cement is 10%.

| Cement C | Cement E | % C3S E cement | % C3A C cement | W/C | Aggregate 4-12 | Sand 0-6 | Sand Silicea L70/80 | Superplast. Glenium T | % Delvocrete Stabiliser E |
|---|---|---|---|---|---|---|---|---|---|
| 360 | 40 | 81 | 9 | 0.35 | 650 | 770 | 450 | 1.40% | 0.35% |
| 360 | 40 | 75 | 17 | 0.35 | 650 | 770 | 450 | 1.40% | 0.35% |

| Cement C | Accelerator (aluminate) | Cone cm | Density test tubes (kg/m³) | Working time before adding the accelerant minutes | Mechanical strength (Mpa) |||||| 
|---|---|---|---|---|---|---|---|---|---|---|
| | | | | | 7 hours | 8 hours | 1 day | 2 days | 7 days | 28 days |
| 360 | 2.50% | 24 | 2342 | 123 | 2.6 | 5.3 | 30.8 | 37.9 | 43.0 | 48.7 |
| 360 | 2.50% | 26 | 2336 | 87 | 3.2 | 3.9 | 28.7 | 37.1 | 41.3 | 47.2 |

TABLE 9

Dosage tests for the manufacture of a concrete obtained from a mixture of C cement (CEM I 42.5 R) with E cement, where the percentage of E cement is 20%.

| Cement C | Cement E | % C3S E cement | % C3A C cement | W/C | Aggregate 4-12 | Sand 0-6 | Sand Silicea L70/80 | Superplast. Glenium T | % Delvocrete Stabiliser E |
|---|---|---|---|---|---|---|---|---|---|
| 320 | 80 | 81 | 9 | 0.35 | 650 | 770 | 450 | 1.40% | 035% |
| 320 | 80 | 75 | 17 | 0.35 | 650 | 770 | 450 | 1.40% | 035% |

TABLE 9-continued

Dosage tests for the manufacture of a concrete obtained from a mixture of C cement (CEM I 42.5 R) with E cement, where the percentage of E cement is 20%.

| Cement C | Accelerator (aluminate) | Cone cm | Density test tubes (kg/m3) | Working time before adding the accelerant minutes | Mechanical strength (Mpa) | | | | | |
|---|---|---|---|---|---|---|---|---|---|---|
| | | | | | 7 hours | 8 hours | 1 day | 2 days | 7 days | 28 days |
| 320 | 2.50% | 25 | 2356 | 115 | 3.8 | 73 | 32.5 | 39.8 | 45.4 | 50.1 |
| 320 | 2.50% | 24 | 2334 | 67 | 5.0 | 5.2 | 32.0 | 35.9 | 45.1 | 48.8 |

Consistency studies have also been carried out on the mixtures of C cement (CEM I 42.5 R) with E cement obtained according to the invention. The results obtained are presented in Table 10. In this, the use of a mixture of C cement (CEM I 42.5 R) with E cement with the following characteristics is shown:
C3S—82% by weight
C3A—9% by weight
C2S (dicalcium silicate)—0
C4AF (Tetracalcium aluminate ferrite)—5% by weight
Blaine: 7200 cm$^2$/g
and to which in addition a retardant has been added, allowing constant workabilities superior to 12 hours to be obtained without prejudice of the rest of the properties.

TABLE 10

Consistency test of a mixture of cements according to the invention.

| | % E cement | 0 | 30 |
|---|---|---|---|
| Total Cement | 430 kg/m3 | | |
| SIKA retardant fluidising additive (% weight of cement) | TM 30 | 0.25 | 0.3 |
| Superplasticising additive | SikaViscocrte SC50 | 0.85 | 1.0 |
| | Water/cement ratio | 0.438 | 0.438 |
| | | Slump | Slump |
| | Initial | 23.5 | 24.5 |
| | 60 minutes | 23 | 24.5 |
| | 120 minutes | 22 | 25.5 |
| | 150 minutes | 22.5 | 25.5 |
| | 180 minutes | 19 | 23.5 |
| | 240 minutes | 14.5 | 23.0 |

Without using retardant additives, workability times at 20° C. of concrete are at 2 hours, and in the case of using other acceleration technologies, such as those discussed in the background section, workability times can be reduced at will until they are practically immediate.

Therefore, in view of the results shown, it can be concluded that the use of the mixtures of the invention, allows the time of workability to be controlled at will from one minute to many hours.

2) Limit in Terms of the Maximum Temperature Reached in the Concrete.

Currently, in order to achieve early strength, normal cements need to be overdosed, meaning that temperatures rise much higher even than those considered very dangerous in the future durability of concrete.

The cement mixtures according to the invention allow a high initial strength to be obtained, but with minor rise of temperature since their mechanical performance to initial ages is very high compared to their development of heat and as it can be observed in Table 11, where the comparison of variation of the temperature for a C cement (CEM I 42.5 R) is shown with a mixture of E cement, strengths up to the compression of 4.5 MPa to 8 hours can be obtained with minor maximum temperature in the concrete. To carry out the measurements, once the concrete has been mixed and kneaded and the test tubes have been made, it is subjected to a heated environment of 30° C. for 8 hours and then maintained at an ambient temperature of 20° C. and the temperatures are measured as the test tubes are broken under compression.

TABLE 11

Result of the thermal treatment of a cement mixture.

| | Cement C, CEM I 42.5 R (kg/m$^3$) | | | |
|---|---|---|---|---|
| | 400 | 400 | 300 | 300 |
| | | Cement E, CEM I 52.5 R, C3S-79%, C3A-9% (kg/m$^3$) | | |
| | 0 | 0 | 6 | 6 |
| Age | MPa | T (° C.) | MPa | T (° C.) |
| 4 hours | 0 | 32.3 | 0.2 | 31.8 |
| 6 hours | 0.3 | 34.1 | 0.6 | 34.5 |
| 8 hours | 4.7 | 42.6 | 5.0 | 43.3 |
| 12 hours | 13.8 | 54.2 | 15.6 | 48.8 |
| 1 day | 27.0 | 33.5 | 26.7 | 32.7 |
| 7 days | 34.6 | | 33.4 | |
| 28 days | 41.4 | | 36.5 | |
| Density (kg/m$^3$) | 2413 | | 2408 | |
| Total C3A (%) | 0.33 | | 0.26 | |
| Total Na$_2$O (%) | 0.13 | | 0.10 | |
| Kg Na$_2$O equiv of the cement | 3.2 | | 2.4 | |

3) Durability

As indicated in the background section, the durability of cement derivatives such as concrete is affected by factors such as, for example, the reactions of cement alkalis with the aggregates that make up the concrete derivative and chemically aggressive environments, among others.

With the mixtures described in the present invention, the quantity of cement to be used decreases considerably, and therefore the total quantity of alkalis and C3A (which must also be controlled depending on the desired application of the concrete, as is the case, for example, of sulforesistant cements) decreases considerably, since, as previously indicated, the total quantity of these components, either in the cement mixture or in the cement derivative obtained, is obtained as a weighted average of the components in the cements constituting said mixture.

As an example, if a concrete is needed that requires a compressive strength at 8 hours of 5 MPa and at 28 days of 35 MPa, with a maximum temperature 50° C. and an alkali content lower than 3 kg/m$^3$, we can see from the data in Table 10 above that the use of a C cement, CEM I 42.5 R, provides compressive strengths at 8 hours slightly lower than desired, while the compressive strengths at 28 days are higher than required. In addition, the 50° C. temperature is exceeded. On the contrary, if a mixture of C cement with a low quantity of E cement is used, the established requirements are satisfied and the quantity of alkalis is drastically reduced. The same goes for C3A. This means that this technology allows for many solutions without the need to use cement in many cases low in alkalis or low in C3A, often not available in reasonable distances, which means overall environmental improvements resulting from the use of fewer resources, using less cement, greater durability to reduce harmful elements, greater economy and therefore lower $CO_2$ emissions.

The economic advantages of using less cement are also important. Specifically, an estimate has been made of the savings resulting from the use of the mixture defined in Table 10, and it has been determined that there is an economic advantage provided that the price of E cement is less than 16 times the price of CEM I 42.5 R.

A third aspect of the invention is aimed at a procedure for obtaining cement derivative from the cement mixtures indicated above, which, as will be detailed below, is based on the preparation of a set of C and E cement mixtures from which its compression strength is determined, and the contribution of E cement depending on its percentage to said strength. From the results obtained, a results matrix is constructed, and depending on the compression strength desired in the different ages of the cement derivative to be obtained, and the technical and economic requirements required, the mixtures that satisfy these requirements are determined. The detailed procedure is described in the following example.

A concrete whose composition is selected as a cement derivative:
Cement (kg/m3)—390
Limestone gravel 6-14 (kg/m3)—800
Limestone sand 0-6 (kg/m3)—635
Additive Sika Viscocrete 20 (% by weight in cement)—2.0
w/c (water/cement)—0.380
Flow extension (diameter in mm)—700
Density (kg/m3)—2463
Concrete temperature (° C.)—20.5

The cement for the preparation of said concrete corresponds to mixtures of C cement and E cement in the range of 0.5% to 50%, preferably from 0.5% to 30% in weight, in relation to the total weight of the mixture. The compressive strength of these mixtures, $Ri_{mix}$, and the compressive strength of C, Ric cement at different ages ranging from 0 to 28 days are determined.

Tables 12 and 13 show, respectively, the description of the cements used and the results of the compressive strengths of the mixtures and of C cement. Measurements are preferably performed at 2-hour intervals in the time interval from 0 to 24 hours, and at 1-day intervals in the time interval from 1 day to 28 days.

TABLE 12

Characteristics of the cements used.

| | Compression strength (MPa) UNE 196-1 | |
|---|---|---|
| | C cement (CEM I 42.5 N) | E cement (CEM I 52.5 R) |
| Age | | |
| 1 day | 12.0 | 47.1 |
| 2 days | 22.0 | 55.5 |
| 7 days | 39.0 | 65.5 |
| 28 days | 54.0 | 71.8 |
| Consistency of mortar shakes (%) | 96.0 | 57.0 |
| Mixing water (%) | 26.6 | 37.1 |
| Setting principle (min) | 210 | 80 |
| Setting finish (min) | 290 | 105 |
| Le Chatelier Expansion (m.m) | C-0.0 | C-0.0 |
| Clinker (%) | 95 | 95 |
| Plaster (%) | 5 | 5 |
| C3S (%) | 41 | 82 |
| C3A (%) | 36 | 9 |
| C2S (%) | 9 | 0 |
| C4AF (%) | 36 | 5 |

TABLE 13

Compressive strengths of different cement mixtures C (CEM I 42.5 N) and E depending on the percentage of E cement defined in Table 12 in the mixture, at different ages.

| | Compressive Strengths (MPa) | | | |
|---|---|---|---|---|
| | 0% E cement | 15% of E cement | 30% of E cement | 40% of E cement |
| Age | | | | |
| 6 hours | 0 | 1.4 | 1.9 | 2.5 |
| 8 hours | 0 | 4.3 | 6.5 | 11.2 |
| 10 hours | 4.2 | 14.7 | 18.6 | 27.1 |
| 12 hours | 8.2 | 25.3 | 31.5 | 37.7 |
| 15 hours | 13.1 | 33.2 | 38.3 | 43.2 |
| 20 hours | 19.5 | 39.2 | 43.4 | 46.4 |
| 1 day | 24 | 41.9 | 45.3 | 48.0 |
| 2 days | 28 | 49.2 | 53.0 | 55.2 |
| 3 days | 32 | 51.5 | 54.7 | 57.0 |
| 7 days | 37 | 58.2 | 63.2 | 64.1 |
| 28 days | 41 | 65.6 | 69.4 | 69.6 |

The contribution to the compressive strength of the mixtures, CRi, per kg of C cement and E cement for each age, is then obtained using the formulas:

$$CRi \text{ per kg } C \text{ cement} = Ri_C/m_{totalCcement} \qquad (1)$$

$$CRi \text{ per kg cement } E = (Ri_{mix} - (Ri_C * m_C/m_{total}))/m_E \qquad (2)$$

where $m_{total}$ is the sum of the cement mass C, $m_C$, and the cement mass E, $m_E$.

The results of these contributions are presented in Table 14 below.

TABLE 14

Contribution to the compressive strength in MPa of CRi mixtures per kg of C cement (CEM I 42.5 N) and E cement defined in Table 12 depending on age.

| | CRi per kg C cement | CRi per kg E cement | | |
|---|---|---|---|---|
| | 0% E cement | 15% of E cement | 30% of E cement | 40% of E cement |
| 6 hours | 0 | 0.02 | 0.02 | 0.02 |
| 8 hours | 0 | 0.07 | 0.06 | 0.07 |
| 10 hours | 0.01 | 0.19 | 0.13 | 0.16 |
| 12 hours | 0.02 | 0.31 | 0.22 | 0.21 |

TABLE 14-continued

Contribution to the compressive strength in MPa of CRi mixtures per kg of C cement (CEM I 42.5 N) and E cement defined in Table 12 depending on age.

| | CRi per kg C cement | CRi per kg E cement | | |
|---|---|---|---|---|
| | 0% E cement | 15% of E cement | 30% of E cement | 40% of E cement |
| 15 hours | 0.03 | 0.38 | 0.25 | 0.23 |
| 20 hours | 0.05 | 0.39 | 0.25 | 0.22 |
| 1 day | 0.06 | 0.37 | 0.24 | 0.22 |
| 2 days | 0.07 | 0.43 | 0.29 | 0.25 |
| 3 days | 0.08 | 0.42 | 0.28 | 0.24 |
| 7 days | 0.09 | 0.46 | 0.32 | 0.27 |
| 28 days | 0.11 | 0.53 | 0.35 | 0.29 |

Figure 1B:
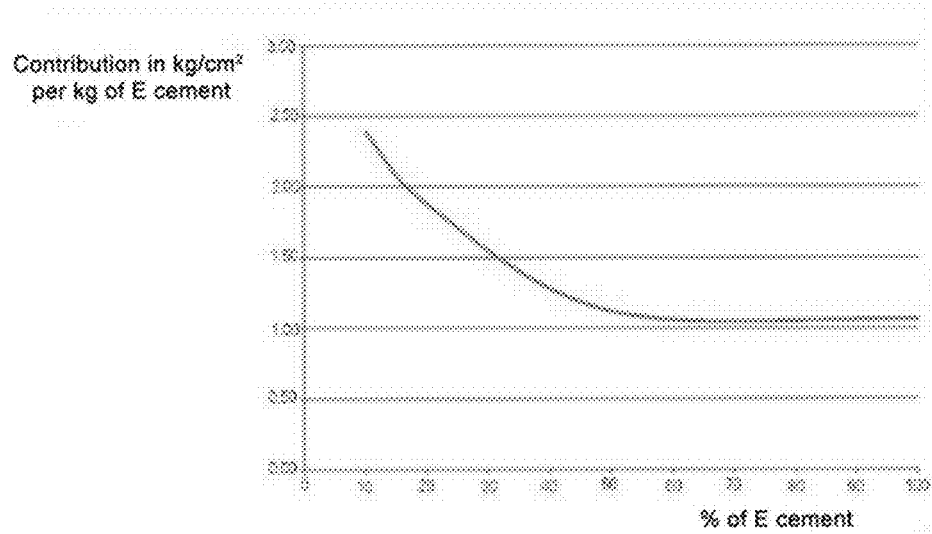
FIG. 1b)—FIG. 1b) represents the real contribution of E cement per kg to the 28-day compressive strength of a mixture of C cement (CEM I 42.5 N) with E cement whose characteristics are defined in Table 11.

From these data, the trend previously indicated is confirmed, which consists of the fact that the contribution of E cement to the strength of the mixture per kg of cement does not follow a linear trend, but rather a trend such as that shown in FIG. 1b), which corresponds specifically to the variation in the compression strength of the data shown in Table 14 at an age of 28 days.

The percentage of contribution to the compressive strength of E cement with respect to C cement is obtained below; given by:

$$(CRi \text{ per kg } E \text{ cement}/CRi \text{ per kg } C \text{ cement}) \times 100 \quad (3)$$

The results are shown in Table 15 below.

TABLE 15

Percentage of contribution to the compressive strength of E cement defined in Table 12 with respect to that of C cement (CEM I 42.5 N) depending on age.

| | Percentage of contribution to the compressive strength of E cement with respect to that of C cement (%) | | |
|---|---|---|---|
| | 15% of E cement | 30% of E cement | 40% of E cement |
| 6 hours | ∞ | ∞ | ∞ |
| 8 hours | ∞ | ∞ | ∞ |
| 10 hours | 1767 | 1244 | 1490 |
| 12 hours | 1493 | 1045 | 866 |
| 15 hours | 1125 | 740 | 553 |
| 20 hours | 773 | 508 | 391 |
| 1 day | 597 | 396 | 328 |
| 2 days | 605 | 397 | 301 |
| 3 days | 506 | 337 | 266 |
| 7 days | 482 | 336 | 240 |
| 28 days | 500 | 331 | 234 |

In this table it can be seen that the maximum efficiency is reached at short ages with low percentages of substitution of common C cement with E cement, and that this contribution decreases with the increase of the percentage of E cement in the mixture and the age of the concrete. In cases where the contribution to the strength per kg of C cement is zero (at ages of 6 and 8 hours), the value of the percentage contribution to the strength of the mixture of E cement is mathematically a value equal to infinity.

From these results it can be deduced that, for example, in order to obtain concretes with strength at ages less than 10 hours with this C cement, it is necessary to use a percentage of the E cement. If the aim is to obtain a concrete that develops 4.2 MPa at 10 hours, only the common C cement can be used (see Table 13). As an example, a mixture could be prepared with 275 kg of C cement and 25 kg of E cement, which develops the compressive strengths shown in Table 16 and represents a saving of approximately 6% even with a price of E cement, 4 times higher than that of C cement, in addition to the environmental improvement resulting from the saving of kilograms of cement used.

TABLE 16

Compressive strengths of a cement mixture containing 275 kg of C cement (CEM I 42.5 N) with 25 kg of E cement defined in Table 12.

| Age | Compression strength (MPa) |
|---|---|
| 6 hours | 0.63 |
| 8 hours | 1.88 |
| 10 hours | 7.71 |
| 12 hours | 13.58 |
| 15 hours | 18.56 |
| 20 hours | 23.18 |
| 1 day | 25.79 |
| 2 days | 30.23 |
| 3 days | 32.50 |
| 7 days | 37.00 |
| 28 days | 41.48 |

In other applications where, for example, only a strength of 4.2 MPa at 10 hours is required, but it is not necessary to reach 41 MPa at 28 days (see Table 13), the most efficient solution is a mixture containing 294 kg/m3 of cement, of which 6 are of E cement. In this case the compressive strengths of this mixture depending on age are as follows:

TABLE 17

Compressive strengths of a cement mixture containing 294 kg of C cement (CEM I 42.5 N) with 6 kg of E cement defined in Table 12.

| Age | Compression strength (MPa) |
|---|---|
| 6 hours | 0.1 |
| 8 hours | 0.4 |
| 10 hours | 4.2 |
| 12 hours | 7.9 |
| 15 hours | 11.8 |
| 20 hours | 16.6 |
| 1 day | 19.8 |
| 2 days | 23.1 |
| 3 days | 26.0 |
| 7 days | 29.9 |
| 28 days | 33.2 |

This mixture has economic advantages at 20% for a price of E cement 4 times higher than C cement. In addition, the environmental advantages are also very important, as can be seen in Table 18, which shows the reduction of $CO_2$ per $m^3$ of concrete, the amount of $CO_2$ having been obtained with the formula:

$$\text{Kg } CO_2/m^3 \text{ concrete} = (m_C \times \text{Kg } CO_2/t\ C \text{ cement} + m_E \times \text{Kg } CO_2/t\ E \text{ cement})/1000.$$

This table shows the reduction in $CO_2$ achieved in two mixtures with different amounts of E cement.

TABLE 18

CO2 reduction for two mixtures of C cement (CEM I 42.5 N) with E cement defined in Table 12.

| | Reduction (%) |
|---|---|
| Kg $CO_2$/t C cement | 850 |
| Kg $CO_2$/t E cement | 920 |

TABLE 18-continued

CO2 reduction for two mixtures of C cement (CEM I 42.5 N) with E cement defined in Table 12.

| | | Reduction (%) |
|---|---|---|
| Kgs $CO_2/m^3$ concrete using 390 kg C cement | 331.5 | |
| Kgs $CO_2/m^3$ concrete using 274 kg of C cement and 26 kg of E cement | 256.82 | 22.5 |
| Kgs $CO_2/m^3$ concrete using 294 kg of C cement and 6 kg of E cement | 255.42 | 23 |

All the above data demonstrate the flexibility of this technology in obtaining cement derivatives that are efficient not only from an economic point of view, but also in terms of durability and the environment, due to the significant reduction in the amount of cement to be used.

Using this procedure, different E and C cements and different total cement masses can be used, and a matrix of results can be constructed as indicated above, so that depending on the desired compressive strength at different ages, and the technical and economic requirements required, using the results of the solution matrix, the contributions of C and E cements to the strengths for each age, and the percentage of E cement, the optimal mixtures that meet these requirements can be determined.

These results are even more evident if the common C cement used is a cement with category 32.5 or lower. However, if the common C cements used are of a higher category than that indicated in the previous example, results are also obtained that demonstrate the advantages of these mixtures. Thus, for example, the results obtained for a concrete that is obtained in the same way as in the previous example, using the same E cement, but now using a common C cement, CEM I 52.5 R whose characteristics are as follows:

TABLE 19

Characteristics of common C cement, CEM I 52.5 R

| Age | Compression strength (MPa) UNE 196-1 C cement |
|---|---|
| 6 hours | 0.5 |
| 8 hours | 0.8 |
| 10 hours | 2.9 |
| 12 hours | 4.1 |
| 14 hours | 6.3 |
| 20 hours | 9.8 |
| 1 day | 13.0 |
| 2 days | 27.7 |
| 7 days | 46.1 |
| 28 days | 59.9 |
| Consistency of mortar shakes (%) | 85 |
| Mixing water (%) | 27.7 |
| Setting principle (min) | 190 |
| Setting finish (min) | 240 |
| Le Chatelier Expansion (m.m) | C-0.0 |

The compressive strengths of the mixtures obtained using a percentage of E cement of 15%, as well as the contribution to the compressive strength of the mixtures, CRi, per kg of C cement and E cement and the percentage contribution to the compressive strength of E cement with respect to that of C cement obtained according to formulas (1) to (3) above, are as follows.

TABLE 20

Compressive strengths of different cement mixtures C (CEM I 52.5 R) and E depending on the percentage of E cement in the mixture, at different ages.

| | Compressive Strengths (MPa) | |
|---|---|---|
| Age | 0% E cement | 15% of E cement |
| 6 hours | 0 | 1.7 |
| 8 hours | 3.3 | 9.6 |
| 10 hours | 9.4 | 27.8 |
| 12 hours | 22.1 | 48.0 |
| 15 hours | 31.4 | 59.3 |
| 20 hours | 39.6 | 63.2 |
| 1 day | 41.0 | 65.3 |
| 2 days | 51.9 | 70.6 |
| 3 days | 56.4 | 71.5 |
| 7 days | 61.9 | 79.8 |
| 28 days | 71.5 | 91.3 |

TABLE 21

Percentage of contribution to the compressive strength of E cement with respect to that of C cement (CEM I 52.5 R) depending on age.

| | Percentage of contribution to the compressive strength of E cement with respect to that of C cement (%) 15% of E cement |
|---|---|
| 6 hours | ∞ |
| 8 hours | 1373 |
| 10 hours | 1405 |
| 12 hours | 881 |
| 15 hours | 692 |
| 20 hours | 497 |
| 1 day | 495 |
| 2 days | 340 |
| 3 days | 278 |
| 7 days | 293 |
| 28 days | 285 |

In the same way as in the previous case, the high percentage of contribution to the compressive strength of the mixtures on the part of E cement, which although lower than those observed using a lower category of C cement, are still very high, is shown.

Mixes have also been obtained using E cement from the previous examples with several common cements containing pozzolans, fly ash, slag and silica smoke, and it has been observed that the advantages obtained are even greater than those observed in the cases described above, for two reasons: one because these cements have a low initial strength and are generally of categories 32.5 and 42.5 and, as has been commented in these categories, the contribution of E cement is higher; and the second because the activation level of the active additions with the particles of E cement is very high, which means that the strengths normally given by these active additions in the long term, even exceeding 28 days, are achieved in shorter terms and therefore in industrially operating times.

Table 22 shows the results obtained of the percentage contribution to the compressive strength of E cement with respect to that of C cement for these mixtures, which have been obtained in the manner described above.

TABLE 22

Percentage of contribution to the compressive strength of E cement with respect to that of C cement for different types of C cement depending on age.

Percentage of contribution to the compressive strength of E cement with respect to C cement, for mixtures with different cements C containing 15% E cement (%)

|  | CEM II/A-V 32.5N | CEM II/A-V 42.R | CEMII/B-V 32.N | CEM II/A-S 32.N | CEM II/A-S 42.R | CEMII/B-S 32.N |
|---|---|---|---|---|---|---|
| 6 hours | ∞ | ∞ | ∞ | ∞ | ∞ | ∞ |
| 8 hours | ∞ | ∞ | ∞ | ∞ | ∞ | ∞ |
| 10 hours | ∞ | ∞ | ∞ | ∞ | ∞ | ∞ |
| 12 hours | ∞ | 1990 | ∞ | ∞ | 1678 | ∞ |
| 15 hours | ∞ | 1500 | ∞ | ∞ | 1399 | ∞ |
| 20 hours | 3487 | 1031 | 3700 | 3133 | 1130 | 3021 |
| 1 day | 2823 | 796 | 2890 | 2623 | 843 | 2390 |
| 2 days | 2390 | 807 | 2345 | 2511 | 790 | 2123 |
| 3 days | 1234 | 765 | 1890 | 1034 | 715 | 1090 |
| 7 days | 980 | 720 | 1800 | 680 | 620 | 800 |
| 28 days | 874 | 694 | 1780 | 674 | 584 | 580 |

As indicated above, the values "∞" indicate that the contribution of C cement to the strength of the mixture is nil.

All of the above is compatible with procedures for accelerating the performance of cement derivatives, such as the addition of chemical additives or heat treatments. In fact, they are techniques that can be used, simultaneously presenting interesting synergies in cases that have proven to be effective, although this invention also makes it possible to eliminate them or mitigate their use.

For illustrative purposes, a sample of synergy of the present invention with the heat treatment technique is shown Specifically, the results are shown for the percentage contribution to the compressive strength of E cement with respect to that of C cement, of a concrete prepared with mixtures of C cement, which is CEM cement I 42.5 R and a special E cement, which is the same as in the previous examples. Once the concrete has been mixed and kneaded and the test tubes have been made, it is subjected to a heated environment of 30° C. for 8 hours and then maintained at an ambient temperature of 20° C. The temperatures are measured as the test tubes are broken under compression.

The results obtained are shown in Tables 23 (thermal test results) and 24 (percentages of contribution to the compressive strength of E cement with respect to that of C cement).

TABLE 23

Result of the thermal treatment of a cement mixture.

| | Cement C, CEM I 42.5 R (kg/m$^3$) | | | | | | | |
|---|---|---|---|---|---|---|---|---|
| | 400 | 400 | 360 | 360 | 320 | 320 | 200 | 200 |
| | | | Cement E, CEM I 52.5 R, C3S-79%, C3A-9% (kg/m$^3$) | | | | | |
| Age | 0 MPa | 0 T (° C.) | 40 (10%) MPa | 40 T (° C.) | 80 (20%) MPa | 80 T (° C.) | 200 (50%) MPa | 200 T (° C.) |
| 4 hours | 0 | 32.3 | 1.2 | 35.6 | 2.3 | 37.5 | 4.9 | 40.1 |
| 6 hours | 0.3 | 34.1 | 2.1 | 39.7 | 4.6 | 40.1 | 9.5 | 44.7 |
| 8 hours | 4.7 | 42.6 | 14.1 | 53.7 | 15.9 | 48.9 | 21.8 | 63.4 |
| 12 | 13.8 | 54.2 | 23.2 | 53.5 | 26.4 | 63.8 | 30.5 | 65.4 |
| 1 day | 27.0 | 33.5 | 36.7 | 33.8 | 37.2 | 64.4 | 37.2 | 52.3 |
| 7 days | 34.6 | | 46.5 | | 45.4 | | 45.6 | |
| 28 days | 41.4 | | 50.1 | | 53.4 | | 53.8 | |

TABLE 24

Percentage of contribution to the compressive strength of E cement with respect to that of C cement depending on age, for a concrete obtained from mixtures that have undergone thermal treatment.

Percentage of contribution to the compressive strength of E cement with respect to that of C cement (%)

| | 10% of E cement | 20% of E cement | 50% of E cement |
|---|---|---|---|
| 4 hours | ∞ | ∞ | ∞ |
| 6 hours | 6100 | 7100 | 3867 |
| 8 hours | 2100 | 1296 | 920 |
| 12 hours | 781 | 559 | 399 |
| 1 day | 458 | 289 | 243 |
| 7 days | 445 | 256 | 214 |
| 28 days | 309 | 244 | 189 |

From these data, the same trend is observed as in those cases in which there has been no heat treatment, but the high results are brought forward by a couple of hours, which shows not only the advantages of the cement mixtures described in the present invention, but also the versatility they offer when it comes to being combined with other acceleration techniques that are already known in the technique.

In addition to the advantages indicated above, through the description and previous examples, the inventor considers that the advantages of using mixtures of a C cement, which is a common cement according to standard UNE-EN 197-1, with an E cement also defined in the description, where the proportion of E cement in the total mix is in the range of 0.5% to 50% by weight, as well as the use of this in the manufacturing of cement derivatives such as concretes, have been demonstrated. It is also possible to use them for the manufacturing of other cement derivatives, such as mortars and slurries.

In addition, it is also noteworthy that the use of these mixtures is compatible with old cement factories, which, unlike modern factories, have small dimensions that are not competitive in costs with modern ones, which leads to their closure or difficult survival. This is due to the fact that nowadays cement factories tend to be designed with a tendency towards large installations destined for high productions. Their raw materials, their combustion technologies that tend to use alternative fuels, their grinding and storage systems are designed to produce standard clinkers with very low costs and which meet the highest percentage of use of cement applications, in which high initial strengths are not required, but which neglect that very important technological niche of derivatives with high initial strengths, with non-optimised solutions such as overdosing. However, this reduced dimensioning of old factories is required for producing E cements of the mixtures described here, since, as we have seen, products of great added value are obtained using only a very small percentage of E cement in the total cement. Therefore, it is possible to maintain assets with value while providing new and better solutions for those cases where high initial strengths are required.

The invention claimed is:

1. An E cement, comprising:
   a Portland Cement of type and category CEM I 52.5 R according to the UNE-EN 197-1 standard having a granulometric distribution with a Blaine fineness greater than 6500 cm$^2$/g;
   a tricalcium silicate content, C3S, greater than 55% by weight; and
   a tricalcium aluminate content, C3A, greater than 4% and less than 25% by weight;
   wherein a sum of both C3A and C3S is greater than 75% by weight; and
   wherein the E cement has a strength according to UNE 196-1 at 1 day greater than 40 MPa and at 28 days greater than 65 MPa, determined using 225±1 g of water and an amount of superplasticiser required to achieve a mortar consistency of 200±5 mm in accordance with EN 1015-3.

2. The E Cement of claim 1, wherein the percentage of C3S is in the range of greater than 55% and up to 75% by weight and the C3A content is 10% to less than 25% by weight.

3. The E Cement of claim 1, wherein the percentage of C3S is in the range of 75% to 90% by weight and the C3A content is 10% to less than 25% by weight.

4. The E Cement of claim 1, in which the percentage of C3S is in the range of 65% to 75% by weight and the C3A content is greater than 4% and up to 10% by weight.

5. The E Cement of claim 1, wherein the percentage of C3S is greater than 75% by weight and the C3A content is greater than 4% and up to 10% by weight.

6. The E cement of claim 1 having a Blaine fineness greater than 6500 cm$^2$/g and up to 24500 cm$^2$/g.

7. The E cement of claim 1 having a Blaine fineness of about 8240 cm$^2$/g to about 17400 cm$^2$/g.

8. A cement mixture comprising a C cement and the E cement of claim 1, wherein the proportion of E cement in the total mixture is 0.5% to 50% by weight and wherein the C cement is a common cement according to standard UNE-EN 197-1.

9. The cement mixture of claim 8, wherein the proportion of E cement in the total mixture is 0.5% to 30% by weight.

10. The mixture of claim 8, wherein the proportion of E cement in the total mixture is 2% to 20% by weight.

11. The mixture of claim 8, wherein the proportion of E cement in the total mixture is 2% to 15% by weight.

12. The mixture of claim 8, wherein the proportion of E cement in the total mixture is 2% to 10% by weight.

13. A procedure for obtaining a cement derivative from a cement mixture having a compressive strength in the range of 1 MPa to 100 MPa at times less than 24 h, comprising:
   a) preparing a plurality of the cement mixture of claim 8, varying the percentages of E cement from 0.5% to 50% in relation to the total mixture, and preparing a C cement control;
   b) determining the compressive strength ($Ri_{mix}$) of each of the mixtures obtained in step a), and the compressive strength ($Ri_C$) of the C cement control, at different ages ranging from 0 to 28 days;
   c) obtaining a contribution to the compressive strength ($CRi_C$) per kg C cement for the C cement control and obtaining a contribution to the compressive strength ($CRi_E$) per kg E cement for each of the mixtures, using the formulae:

$$CRi \text{ per kg } C \text{ cement} = Ri_C/m_{totalcementC}$$

$$CRi \text{ per kg } E \text{ cement} = (Ri_{mix} - (Ri_C * m_C/m_{total}))/m_E$$

where $m_{totalcementC}$ is total mass of the C cement control, and $m_{total}$ is the sum of the C cement mass ($m_C$) and the E cement mass ($m_E$) in the cement mixture;
   d) obtaining a percentage of contribution to the compressive strength of E cement with respect to that of the C cement control for each age and for each mixture using the formula:

$$(CRi \text{ per kg } E \text{ cement}/CRi \text{ per kg } C \text{ cement}) \times 100;$$

e) repeating steps a) to d) using different cements E and C and different total cement masses, obtaining a set of results;
   f) using the set of results from step e) and determining the cement mixtures that satisfy the compressive strength in the range of 1 MPa to 100 MPa at times less than 24 h.

14. The procedure of claim 13, wherein step a) further comprises heat treating the mixtures, adding a chemical accelerant to the mixtures, or a combination thereof.

15. The procedure of claim 13, wherein the cement derivative is a concrete, a mortar, or a slurry.

16. The procedure of claim 13, wherein the percentage of E cement in relation to the total mixture varies from 0.5% to 30%.

17. The procedure of claim 13, wherein the compressive strength ($Ri_{mix}$) of each of the cement mixtures obtained in step a), and the compressive strength ($Ri_C$) of the C cement control are determined at 2 hour intervals in the 0 to 24 hour time interval, and at 1 day intervals in the 1 day to 28 day time interval.

18. The procedure of claim 13, wherein the percentage of contribution to the compressive strength of E cement with respect to compressive strength of the C cement control at ages less than 24 hours, as obtained from step d), is 300% higher than compressive strength of C cement in the strength of the cement derivative.

19. A process for the manufacture of a concrete, a mortar, or a slurry, which comprises: mixing a C cement and the E cement of claim 1, wherein the proportion of E cement in the total mixture is 0.5% to 50% by weight and wherein the C cement is a common cement according to standard UNE-EN 197-1.

* * * * *